(12) United States Patent
Kondo (10) Patent No.: US 12,503,109 B2
(45) Date of Patent: Dec. 23, 2025

(54) DECELERATION SUPPORT DEVICE

(71) Applicant: TOYOTA JIDOSHA KABUSHIKI KAISHA, Toyota (JP)

(72) Inventor: Kumiko Kondo, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 366 days.

(21) Appl. No.: 18/103,743

(22) Filed: Jan. 31, 2023

(65) Prior Publication Data

US 2023/0311874 A1    Oct. 5, 2023

(30) Foreign Application Priority Data

Apr. 5, 2022    (JP) .................................. 2022-063088

(51) Int. Cl.
*B60W 30/16* (2020.01)
*B60W 10/04* (2006.01)
(Continued)

(52) U.S. Cl.
CPC ............ *B60W 30/16* (2013.01); *B60W 10/04* (2013.01); *B60W 10/18* (2013.01);
(Continued)

(58) Field of Classification Search
CPC ...... B60W 30/16; B60W 10/04; B60W 10/18; B60W 30/18127; B60W 2540/10; B60W 2540/12; B60W 2554/802; B60W 2720/106; B60W 20/14; B60W 30/0956; B60W 2510/244; B60W 2554/4042; B60W 2554/804; B60W 2520/10; B60W 2754/30; B60W 50/082; B60W 2540/215; B60W 30/143; B60W 30/18109; B60W 30/182;
(Continued)

(56) References Cited

U.S. PATENT DOCUMENTS

2017/0072956 A1 *    3/2017    Nemoto ................. B60W 10/20
2019/0248369 A1 *    8/2019    Mizuno ................. B60W 50/00
(Continued)

FOREIGN PATENT DOCUMENTS

JP        2001225669 A  *   8/2001
JP        2009113763 A  *   5/2009
(Continued)

*Primary Examiner* — Aniss Chad
*Assistant Examiner* — Chase L Cooley
(74) *Attorney, Agent, or Firm* — Sughrue Mion, PLLC (57) ABSTRACT

A control unit is a deceleration support device configured to execute an automatic deceleration control that automatically decelerates an own vehicle until an index value acquired by dividing an inter-vehicle distance between a preceding vehicle and the own vehicle by a relative speed of the own vehicle with respect to the preceding vehicle becomes equal to or greater than an end standard value, when the index value is equal to or less than a start standard value, and when the inter-vehicle distance is equal to or less than a control start distance standard value, in a situation in which a preset permission condition is established. When the traveling mode is an eco mode that reduces energy required for travel, the control unit sets the control start distance standard value to a value for the eco mode that is larger than a standard value for a normal mode.

6 Claims, 9 Drawing Sheets

(51) Int. Cl.
    *B60W 10/18*     (2012.01)
    *B60W 30/18*     (2012.01)

(52) U.S. Cl.
    CPC ... *B60W 30/18127* (2013.01); *B60W 2540/10* (2013.01); *B60W 2540/12* (2013.01); *B60W 2554/802* (2020.02); *B60W 2720/106* (2013.01)

(58) Field of Classification Search
    CPC ......... B60W 50/00; B60W 2050/0095; B60W 2710/18
    See application file for complete search history.

(56)               References Cited

U.S. PATENT DOCUMENTS

| | | | |
|---|---|---|---|
| 2021/0380108 A1 | 12/2021 | Iihoshi et al. | |
| 2022/0305909 A1* | 9/2022 | Ueyama | B60W 30/146 |
| 2023/0001926 A1* | 1/2023 | Ito | B60W 30/16 |

FOREIGN PATENT DOCUMENTS

| | | | |
|---|---|---|---|
| JP | 2015-182629 A | 10/2015 | |
| JP | 2020-066390 A | 4/2020 | |
| JP | 2021-116000 A | 8/2021 | |
| KR | 101977415 B1 * | 5/2019 | |

* cited by examiner

DECELERATION SUPPORT DEVICE

CROSS-REFERENCE TO RELATED APPLICATION

This application claims priority to Japanese Patent Application No. 2022-063088 filed on Apr. 5, 2022, incorporated herein by reference in its entirety.

BACKGROUND

1. Technical Field

The present disclosure relates to a deceleration support device of a vehicle such as an automobile.

2. Description of Related Art

When a target (hereinafter referred to as "deceleration target"), such as a preceding vehicle with a low vehicle speed, that requires deceleration of the vehicle (own vehicle) is detected in front of the own vehicle, a deceleration support device executes automatic deceleration control that automatically decelerates the vehicle by controlling a deceleration device.

For example, as described in Japanese Unexamined Patent Application Publication No. 2021-116000 (JP 2021-116000 A) below, known is a deceleration support device including a target detection device that detects at least a deceleration target in front of a vehicle, and a control device that controls a deceleration device. The control device is configured to execute an automatic deceleration control that automatically decelerates an own vehicle by controlling the deceleration device until it is determined that a preset end condition is established, when it is determined that a preset start condition is established, in a situation in which a braking-driving operation is not detected by a braking-driving operation detection device and a deceleration target is detected by a target detection device and the vehicle is approaching the deceleration target.

SUMMARY

Known is a vehicle including a switch that is operated by a driver and that switches and sets a traveling mode of the vehicle to a normal mode and an eco mode that reduces energy required for traveling of the vehicle so that energy consumed by the vehicle such as an automobile can be decreased. According to this type of vehicle, the driver can reduce the energy required to make the vehicle travel by operating the switch and setting the traveling mode to eco mode.

However, in a conventional deceleration support device such as the deceleration support device described in JP 2021-116000 A, the automatic deceleration control cannot be changed depending on whether the vehicle's traveling mode is a normal mode or an eco mode. Thus, even when the traveling mode of the vehicle is set to the eco mode, the energy consumed by the automatic deceleration control cannot be reduced.

The present disclosure provides a deceleration support device that is improved so that when the traveling mode of the vehicle is in the eco mode, the energy consumed by the automatic deceleration control can be reduced compared to when the traveling mode of the vehicle is in the normal mode.

According to the present disclosure, provided is a deceleration support device (100) including: a target detection device (10) that detects at least a target in front of an own vehicle (50); a braking-driving operation detection device (pressure sensor 26, accelerator operation amount sensor 46) that detects a braking-driving operation by a driver; a deceleration device (20) that decelerates the own vehicle; and a control unit (30) that controls the deceleration device, in which the control unit is configured to execute an automatic deceleration control that automatically decelerates the own vehicle by controlling the deceleration device (S138) until the control unit determines that a preset end condition is established (S132), when the control unit determines that a preset start condition is established (S135, S136), in a situation in which a braking-driving operation is not detected by the braking-driving operation detection device and a preceding vehicle that requires deceleration of the own vehicle is detected by the target detection device and the own vehicle is approaching the preceding vehicle (S10 to S30, S70).

The control unit (30) is configured to calculate an index value (collision prediction time TTC) acquired by dividing an inter-vehicle distance (Dr) between the preceding vehicle and the own vehicle (50) by a relative speed (Vr) of the own vehicle with respect to the preceding vehicle, determine that the preset start condition is established when the inter-vehicle distance (Dr) between the preceding vehicle and the own vehicle becomes equal to or less than a control start distance standard value (Drb) (S136), in a situation in which the index value is equal to or less than a start standard value (TTCa) (S135), and determine that the preset end condition is established when the index value becomes equal to or greater than an end standard value (TTCe) (S132), and in which the own vehicle includes a switch (34) that is operated by the driver and that switches and sets a traveling mode of the own vehicle to a normal mode and an eco mode that reduces energy required for traveling of the own vehicle, and in which the control unit (30) is configured to set the control start distance standard value (Drb) to a value for the eco mode that is larger than a standard value for the normal mode when the traveling mode is set to the eco mode (S80, S110, S120).

According to the above configuration, an index value acquired by dividing an inter-vehicle distance between the preceding vehicle and the own vehicle by a relative speed of the own vehicle with respect to the preceding vehicle are calculated, it is determined that the preset start condition is established when the inter-vehicle distance becomes equal to or less than a control start distance standard value, in a situation in which the index value is equal to or less than a start standard value, and it is determined that the preset end condition is established when the index value becomes equal to or greater than an end standard value.

The control start distance standard value is set to the value for the eco mode that is larger than the standard value for the normal mode when the traveling mode is set to the eco mode. Thus, when the traveling mode is in the eco mode, the inter-vehicle distance between the preceding vehicle and the own vehicle becomes equal to or less than the control start distance standard value earlier than when the driving mode is in the normal mode, and it is determined that the preset start condition is established early. Therefore, the automatic deceleration control is started early, and since the index value becomes equal to or greater than the end standard value early, as will be described later, it is determined that the preset end condition is established early.

As a result, as will be described later, when the traveling mode is in the eco mode, the time of automatic deceleration control can be shortened compared to when the traveling mode is in the normal mode. Therefore, the energy consumed by the automatic deceleration control can be reduced.

In one aspect of the present disclosure, the control unit (30) is configured to variably set a control start distance standard value in accordance with a vehicle speed (V) of the own vehicle so that the higher the vehicle speed of the own vehicle, the larger the control start distance standard value (Drb) (S110, S120).

According to the above aspect, the control start distance standard value is variably set in accordance with the vehicle speed so that the higher the vehicle speed of the own vehicle, the greater the control start distance standard value. Therefore, since the control start distance standard value can be increased as the vehicle speed of the own vehicle increases, the control start distance standard value can be set to an appropriate value according to the vehicle speed. That is, compared to the case where the control start distance standard value is a constant value regardless of the vehicle speed, the possibility that the automatic deceleration control is started unnecessarily early due to the control start distance standard value being too large in a situation where the vehicle speed of the own vehicle is low can be decreased. In contrast, the possibility that the start of automatic deceleration control is delayed due to the fact that the control start distance standard value is too small in a situation where the own vehicle speed of the vehicle is high can be reduced.

In another aspect of the present disclosure, the control unit (30) is configured to set the control start distance standard value (Drb) to a standard value for the normal mode, when a relative deceleration (Gxr) of the preceding vehicle with respect to the own vehicle is equal to or greater than a preset relative deceleration standard value (Gxrc) (S90), even when the traveling mode is set to the eco mode.

According to the above aspect, even when the traveling mode is in the eco mode, when the relative deceleration of the preceding vehicle with respect to the own vehicle is equal to or greater than the preset relative deceleration standard value, the control start distance standard value is set to the standard value for the normal mode. Therefore, when the preceding vehicle is decelerating rapidly, the automatic deceleration control is executed at the control start distance standard value for the normal mode, and the own vehicle can be effectively decelerated so that the own vehicle does not excessively approach the preceding vehicle.

Further, in another aspect of the present disclosure, the deceleration device (20) includes a regenerative brake device (28), and the control unit (30) is configured to set the control start distance standard value (Drb) to a standard value for the normal mode (S110), when a charge margin rate (Rc) of a battery (28A) of the regenerative brake device is equal to or greater than a preset charge margin standard value (Rcf) (S90), even when the traveling mode is set to the eco mode (S80).

According to the above aspect, even when the traveling mode is in the eco mode, when the charge margin rate of the battery of the regenerative brake device is equal to or greater than the preset charge margin standard value, the control start distance standard value is set to the standard value for the normal mode. Therefore, when there is a margin for regeneration by the regenerative brake device, the battery can be effectively charged by executing the automatic deceleration control with the control start distance standard value for the normal mode, effectively decelerating the own vehicle, and regenerating performed by the regenerative brake device.

Further, in another aspect of the present disclosure, the control unit (30) is configured to decelerate the own vehicle such that the own vehicle does not approach the preceding vehicle by a minimum distance (Drbs) or more (S59, S60) when the control unit determines that the preceding vehicle is stationary (S51), and maintain deceleration of the own vehicle (S59, S60) until the control unit determines that a preset release condition is established (S54), when the control unit determines that the preceding vehicle has resumed traveling (S51, S52).

Further, according to the above aspect, when it is determined that the preceding vehicle is stationary, the own vehicle is decelerated so that the own vehicle does not approach the preceding vehicle for more than the minimum distance, and when it is determined that the preceding vehicle has resumed traveling, the deceleration of the own vehicle continues until it is determined that the preset release condition is established.

Therefore, it is possible to suppress the own vehicle from excessively approaching the stationary preceding vehicle, and even if the preceding vehicle resumes traveling, the deceleration of the own vehicle is continued until it is determined that the preset release condition is satisfied and it is possible to suppress the own vehicle from excessively approaching the preceding vehicle.

Further, in another aspect of the present disclosure, the control unit (30) is configured to gradually increase the minimum distance (Drbs) (S53) when the control unit determines that the preceding vehicle has resumed traveling (S51, S52), and determine that the preset release condition is established (S64) when the control unit determines that the relative speed (Vr) is less than a negative relative speed standard value (Vrc) and that the inter-vehicle distance (Dr) exceeds the minimum distance (Drbs) (S63).

According to the above aspect, when the preceding vehicle resumes traveling, the minimum distance is gradually increased, and when it is determined that the relative speed is less than the negative relative speed standard value and that the inter-vehicle distance exceeds the minimum distance, it is determined that the preset release condition is established.

Therefore, compared to the case where the minimum distance is not gradually increased even if the preceding vehicle resumes traveling, the possibility that it is determined that the inter-vehicle distance excessively quickly exceeds the minimum distance can be reduced, and the possibility that the own vehicle excessively approaches the preceding vehicle excessively can be reduced.

In the above description, in order to help understanding of the present disclosure, the names and/or the reference signs used in the embodiment are added in parentheses to the configurations of the disclosure corresponding to the embodiment to be described later. However, each component of the present disclosure is not limited to the component of the embodiment corresponding to the name and/or the symbol attached in parentheses. Other objects, other features and accompanying advantages of the present disclosure will be readily understood from the description of embodiments of the present disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments

With reference to the attached figures below, a deceleration support device according to an embodiment of the present disclosure will be described in detail.

Configuration

Figure 1:
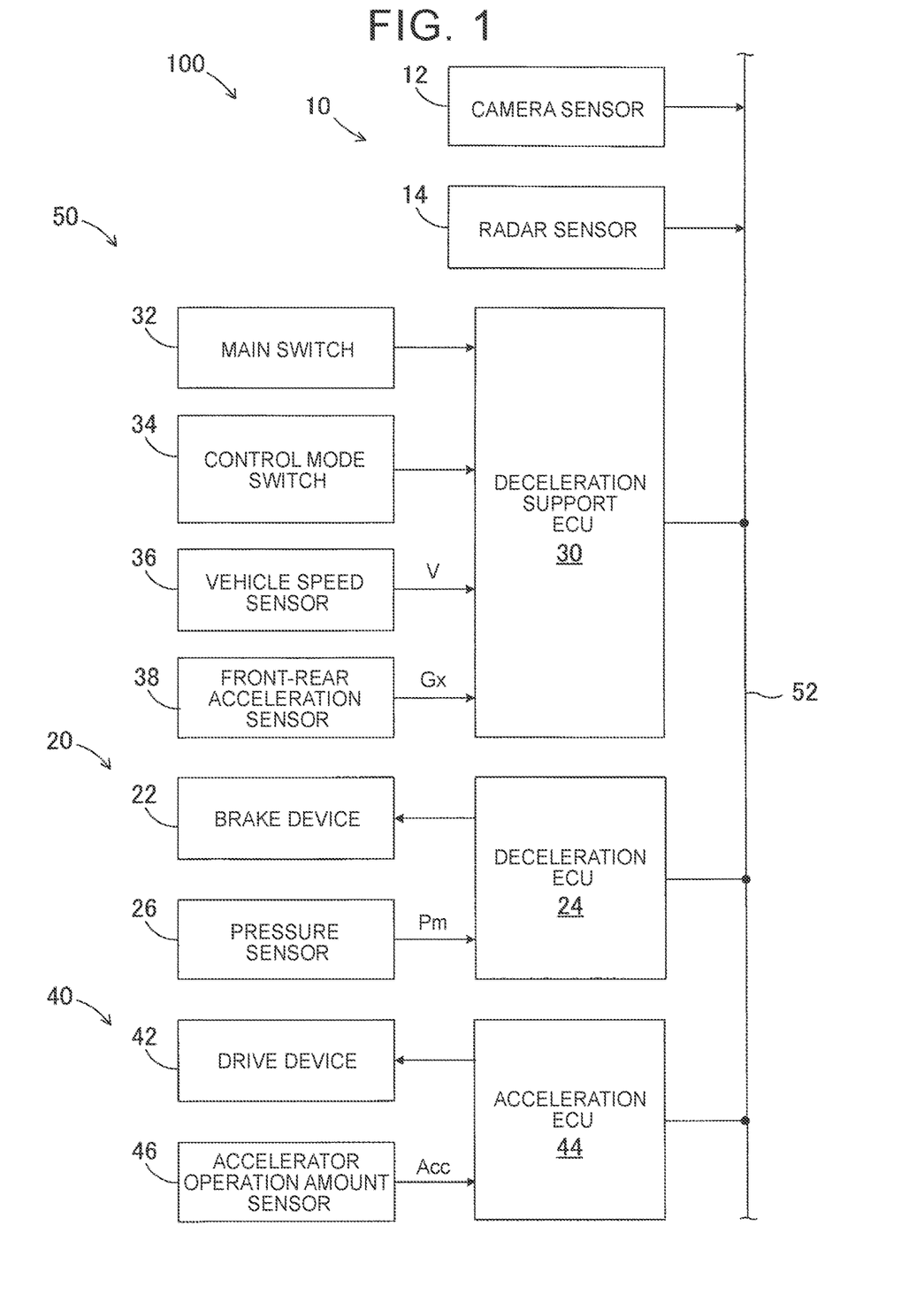
FIG. 1 is a schematic configuration diagram showing embodiments of a deceleration support device according to the present disclosure.

As shown in FIG. 1, a deceleration support device 100 according to the embodiment is applied to a vehicle 50 and includes a target detection device 10 that detects at least a target in front of the vehicle 50, a deceleration device 20 that decelerates the vehicle, and a deceleration support electronic control device 30 that controls the deceleration device. Therefore, the vehicle 50 includes a deceleration support device 100. A main switch 32 and a control mode switch 34 operated by a driver, a vehicle speed sensor 36, and a front and rear acceleration sensor 38 are connected to the electronic control device 30. The vehicle speed sensor 36 and the front and rear acceleration sensor 38 detect a vehicle speed V and a front and rear acceleration Gx of the vehicle 50, respectively.

The deceleration support device 100 operates when the main switch 32 is turned on. The control mode switch 34 is a switch that switches a traveling mode of the vehicle 50 to a normal mode and an eco mode. The eco mode is a control mode that reduces the energy required for traveling of the vehicle compared to the normal mode. In the present application, the "electronic control device" is written as "ECU", which is an abbreviation of an electronic control unit.

Further, the vehicle 50 is referred to as an own vehicle 50 as necessary in order to distinguish it from the preceding vehicle and the like.

The target detection device 10 includes a camera sensor 12 and a radar sensor 14 connected to a controller area network (CAN) 52. The camera sensor 12 includes a camera unit and a recognition unit that recognizes a target that requires deceleration of the vehicle 50 by analyzing image data captured by the camera unit. The camera unit of the camera sensor 12 photographs a scenery at least in front of the vehicle 50, and the recognition unit of the camera sensor 12 repeatedly supplies information on the recognized target in which the vehicle needs to be decelerated to the deceleration support ECU 30 every time a predetermined calculation cycle elapses.

In addition to the camera sensor 12 and the radar sensor 14, a navigation device may be used as an auxiliary detection device for detecting a target that requires vehicle deceleration. In the following description, "the target requiring deceleration of the vehicle" is described as a "deceleration target". The deceleration target includes, for example, a preceding vehicle, a stopped vehicle, a traffic light, a pedestrian crossing, a road sign such as "slow", a road surface sign such as "slow down", an intersection, a street junction, a road curve, and the like.

The radar sensor 14 includes a radar transmission-reception unit and a signal processing unit (not shown). The radar transmission-reception unit emits millimeter wave band radio waves (hereinafter referred to as "millimeter waves") at least in front of the vehicle 50, and receives millimeter waves (that is, reflected waves) reflected by three-dimensional objects present in a radiation range (for example, other vehicles, bicycles, guardrails, etc.). Based on a phase difference between the transmitted millimeter wave and the received reflected wave, an attenuation level of the reflected wave, the time from transmitting the millimeter wave to receiving the reflected wave, and the like, the signal processing unit acquires information indicating a distance between the own vehicle and the three-dimensional object, a relative speed between the own vehicle and the three-dimensional object, and a relative position (direction) of the three-dimensional object with respect to the own vehicle every predetermined time, and supplies the information to the deceleration support ECU 10. Instead of the radar sensor 14 or in addition to the radar sensor 14, light detection and ranging (LiDAR) may be used.

The deceleration device 20 includes a brake device 22 that decelerates the vehicle 50 by applying a braking force to wheels not shown in FIG. 1, and a deceleration ECU 24 that controls the brake device 22. A pressure sensor 26 that detects a master cylinder pressure Pm as a braking operation amount of the driver is connected to the deceleration ECU 24. The deceleration ECU 24 normally controls the brake device 22 based on the master cylinder pressure Pm, and controls the brake device 22 based on a command signal when a command signal related to braking is received from the deceleration support ECU 10.

As shown in FIG. 1, the vehicle 50 includes an acceleration device 40. The acceleration device 40 includes a drive device 42 that accelerates the vehicle 50 by applying a driving force to the drive wheels not shown in FIG. 1, and an acceleration ECU 44 that controls the drive device 42. An accelerator operation amount sensor 46 is connected to the acceleration ECU 44, and the accelerator operation amount sensor 46 detects an accelerator operation amount Acc as a driver's driving operation amount. The acceleration ECU 44 normally controls the drive device 42 based on the accelerator operation amount Acc, and when a command signal related to driving is received from the deceleration support ECU 10, the acceleration ECU 44 controls the drive device 42 based on the command signal.

Since the pressure sensor 26 and the accelerator operation amount sensor 46 detect braking operation and driving operation by the driver, respectively, the pressure sensor 26 and the accelerator operation amount sensor 46 function as a braking-driving operation detection device that detects braking-driving operations (braking operations and driving operations) by the driver, and configures a part of the deceleration support device 100. As the braking-driving operation detection device that detects the braking operation by the driver, a brake lamp switch may be applied instead of the pressure sensor 26.

The drive device 42 may be any drive device known in the technical field such as a combination of an internal combustion engine such as a gasoline engine and a transmission, a so-called hybrid system that is a combination of an internal combustion engine and a motor, a so-called plug-in hybrid system, a combination of fuel cell and a motor, and a motor.

The deceleration support ECU 30, the deceleration ECU 24, and the acceleration ECU 44 are electronic control devices having a microcomputer as a main part, and are connected so that information can be transmitted and received to and from each other via the CAN 52. Each of the microcomputers includes a central processing unit (CPU), a read-only memory (ROM), a random access memory (RAM), a non-volatile memory, and an interface (I/F), and the like. The CPU realizes various functions by executing instructions (programs, routines) stored in the ROM. Some or all of these ECUs may be integrated into one ECU.

Figure 2:
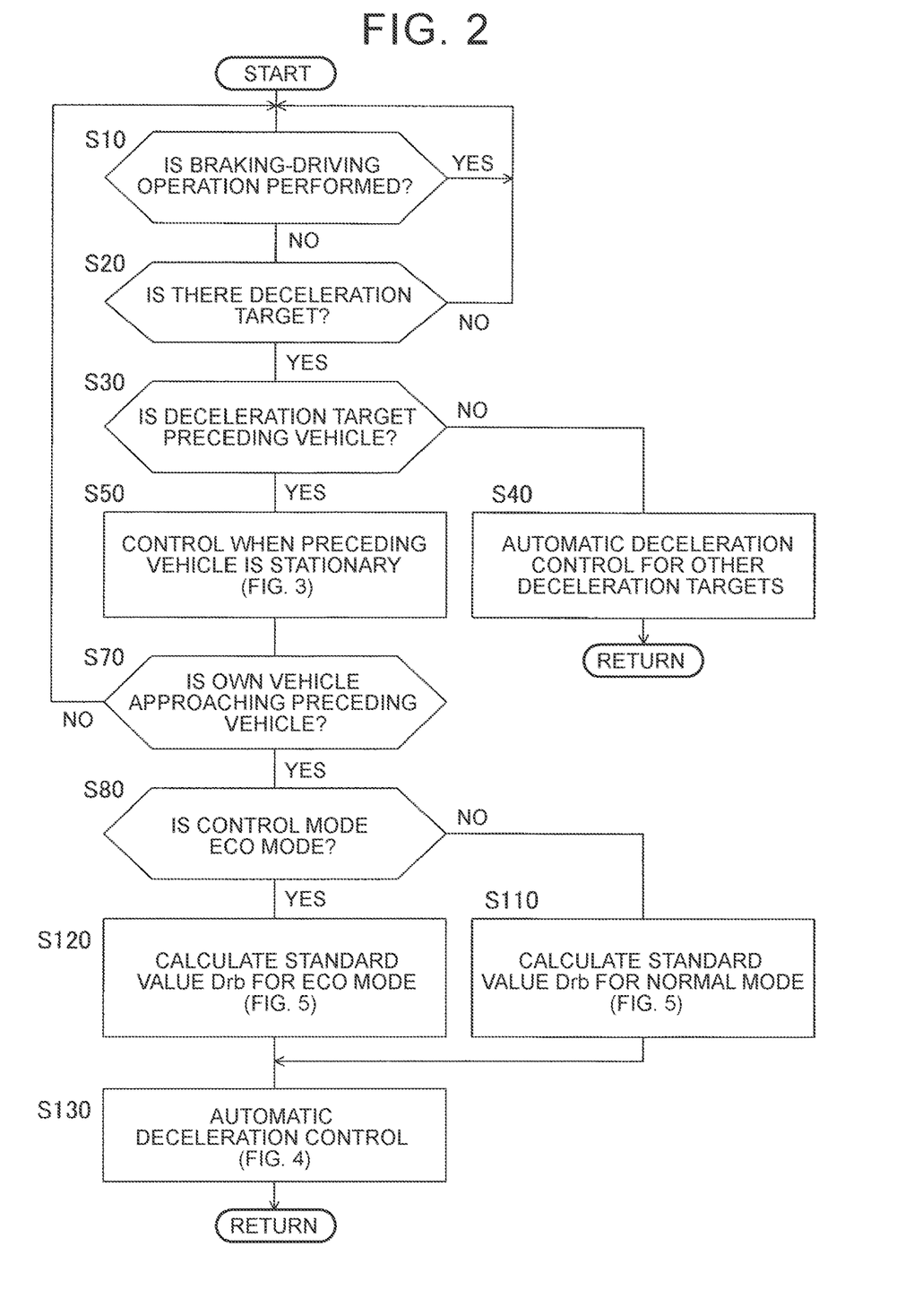
FIG. 2 is a flowchart showing a main routine of deceleration support control in the embodiment.
Figure 3:
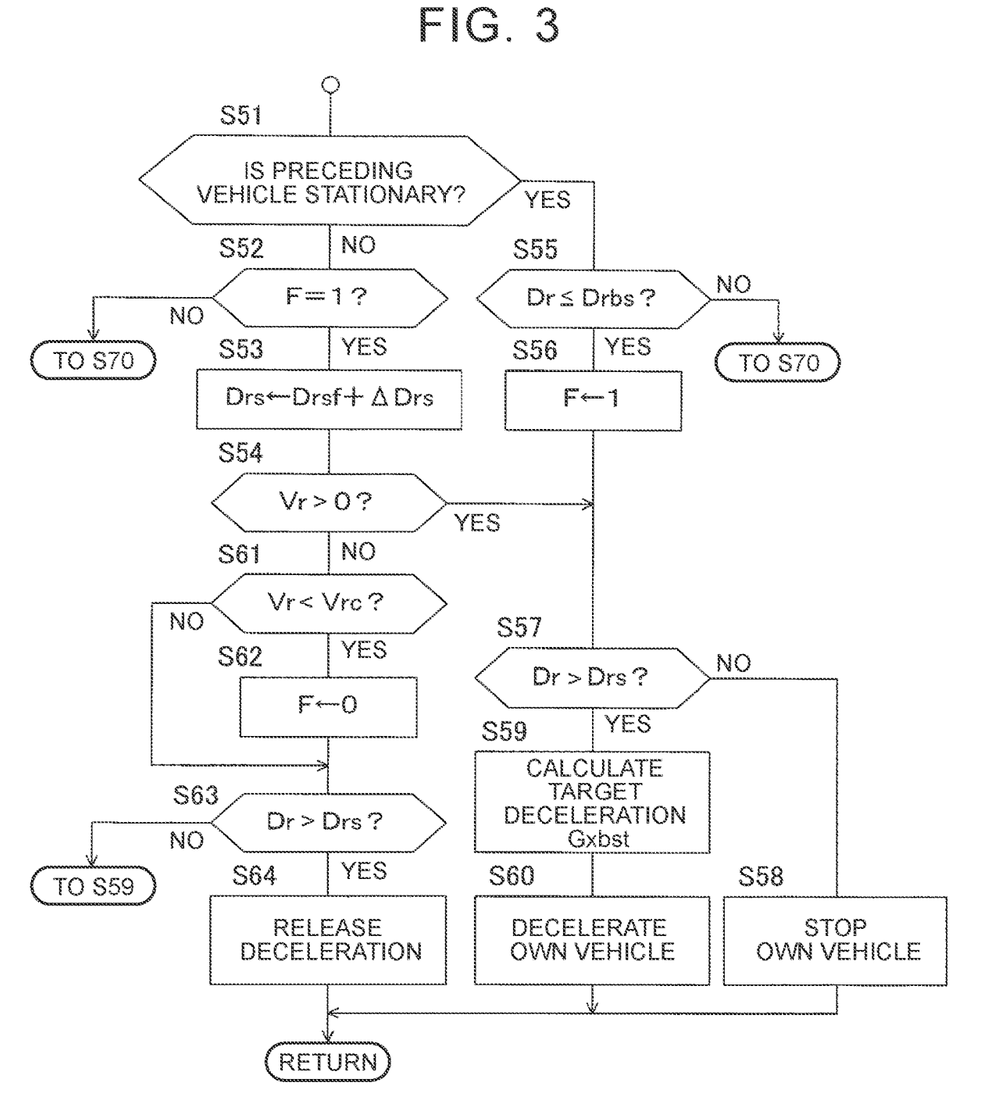
FIG. 3 is a flowchart showing a control subroutine when a preceding vehicle is stationary, in the embodiment.
Figure 4:
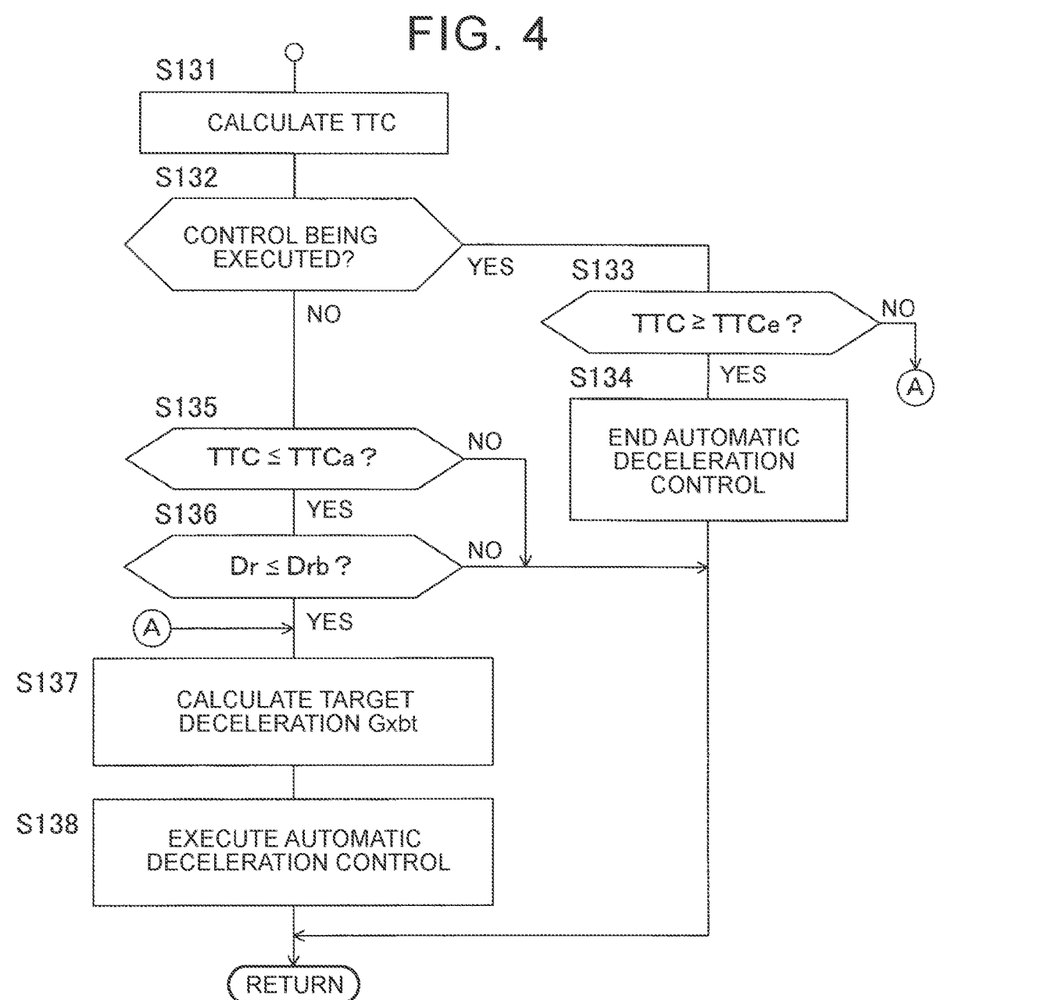
FIG. 4 is a flowchart showing a subroutine of the automatic deceleration control according to the embodiment.

In particular, the ROM of the deceleration support ECU 30 stores a deceleration support control program corresponding to the flowchart shown in FIGS. 2 to 4, and the CPU executes deceleration support control according to the program.

As will be described in detail later, the deceleration support ECU 30 allows execution of automatic deceleration control that automatically decelerates the vehicle 50, when the deceleration target is detected by the target detection device 10 and the braking-driving operation by the driver is not detected by the pressure sensor 26 and the accelerator operation amount sensor 46. On the other hand, even when a deceleration target is detected by the target detection device 10, the deceleration support ECU 30 does not allow the automatic deceleration control to be executed when the braking operation or the driving operation by the driver is detected by the pressure sensor 26 and the accelerator operation amount sensor 48.

Accordingly, the deceleration support ECU 30 determines that an automatic deceleration control permission condition is satisfied when the braking-driving operation by the driver is not been detected, the deceleration target is the preceding vehicle, and the own vehicle 50 is approaching the preceding vehicle. Further, when it is determined that a preset start condition is satisfied, the deceleration support ECU 30 executes the automatic deceleration control.

In particular, the automatic deceleration control is a control that automatically decelerates the vehicle 50 by controlling the deceleration device 20 and automatically applying braking force to the wheels without requiring the braking operation by the driver. Further, the automatic deceleration control is executed by outputting an execution command of the automatic deceleration control from the deceleration support ECU 30 to the deceleration ECU 24.

In a situation where the automatic deceleration control is executed, the automatic deceleration support ECU 30 cancels the automatic deceleration control when the driver's braking operation is detected by the pressure sensor 26 or when the driver's driving operation is detected by the accelerator operation amount sensor 46.

Deceleration Support Control Routine

Next, with reference to the flowchart shown in FIGS. 2 to 4, the deceleration support control routine in the embodiment will be described. The deceleration support control by the flowchart shown in FIGS. 2 to 4 is repeatedly executed by the CPU of the deceleration support ECU 30 at a predetermined control cycle when the main switch 32 is turned on. In the following description, the deceleration support control is simply referred to as a "present control".

First, in step S10, the CPU determines whether a braking operation or a driving operation is performed by the driver. When the CPU makes an affirmative determination, the present control is temporarily terminated, and when the CPU makes a negative determination, that is, when the CPU determines that the braking-driving operation is not performed by the driver, the CPU proceeds to step S20. When the master cylinder pressure Pm detected by the pressure sensor 26 is equal to or higher than a standard value, it may be determined that the braking operation is being performed by the driver. Further, when the accelerator operation amount Acc detected by the accelerator operation amount sensor 46 is equal to or higher than a standard value, it may be determined that the driving operation is being performed by the driver.

In step S20, the CPU determines whether the deceleration target is detected by the camera sensor 12 and/or the radar sensor 14. When the CPU makes the negative determination, the CPU temporarily ends the present control, and when the CPU makes the affirmative determination, the CPU advances the present control to step S30. When the deceleration target is detected, that fact may be displayed on a display device not shown in FIG. 1.

In step S30, the CPU determines whether the deceleration target is the preceding vehicle. When the CPU makes the affirmative determination, the CPU advances the present control to step S50, and when the CPU makes the negative determination, the CPU advances the present control to step S40.

Figure 6:
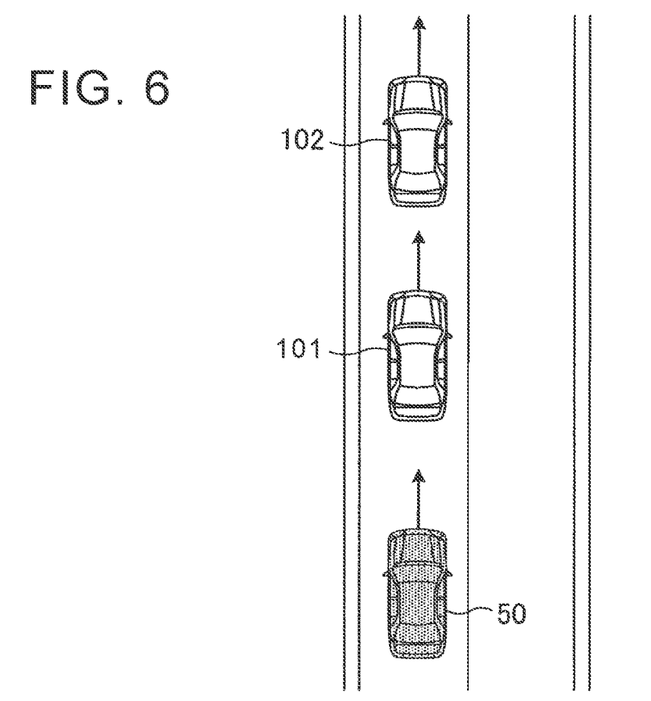
FIG. 6 is a diagram showing a situation where there are two preceding vehicles in front of an own vehicle.
Figure 7:
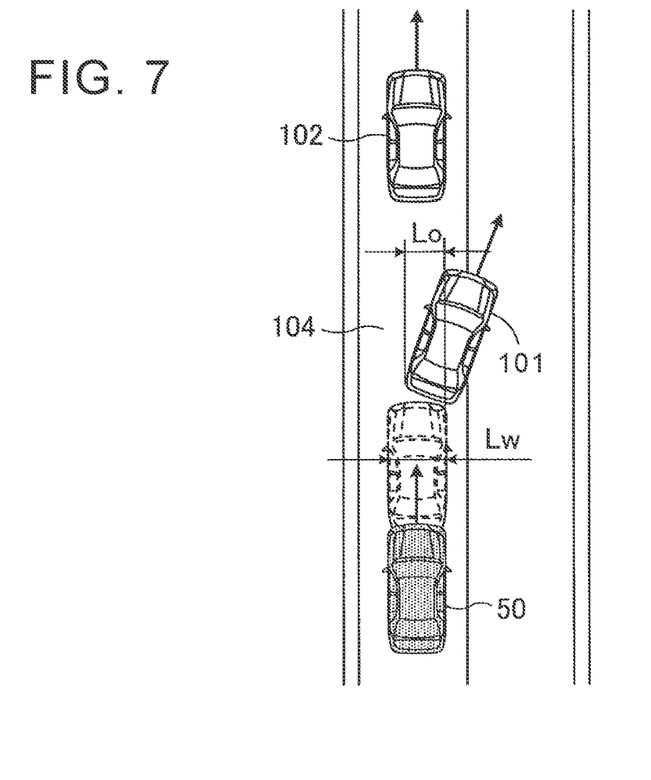
FIG. 7 is a diagram showing a situation in which there are two preceding vehicles in front of the own vehicle and the preceding vehicle is changing lanes.
Figure 8:
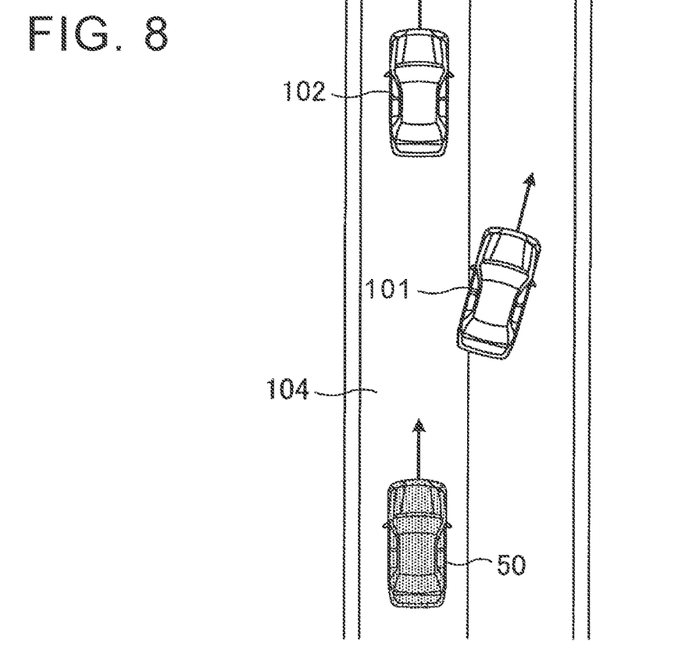
FIG. 8 is a diagram showing a situation in which there are two preceding vehicles in front of the own vehicle and the preceding vehicle completes changing lanes.

As shown in FIG. 6, when there are two preceding vehicles 101 and 102 or more preceding vehicles in front of the own vehicle 50, the preceding vehicle 101 immediately preceding the own vehicle 50 is determined to be the preceding vehicle. Further, as shown in FIG. 7, even when the preceding vehicle 101 immediately in front has changed lanes, as long as an overlap rate Ro between the own vehicle 50 and the preceding vehicle 101 immediately in front is not less than a standard value Roc, the preceding vehicle 101 immediately in front is determined to be the preceding vehicle. Further, as shown in FIG. 8, when the preceding vehicle 101 immediately in front changes lanes and the overlap rate Ro between the own vehicle 50 and the preceding vehicle 101 immediately in front is equal to or less than the standard value Roc, the preceding vehicle 102 is determined to be the preceding vehicle. In this case, the standard value Roc may be a positive constant such as 0.05 or may be 0.

The overlap rate Ro may be calculated as follows. As shown in FIG. 7, when the own vehicle 50 is moved to a position where the own vehicle becomes in contact with the preceding vehicle 101, along a lane 104 that the own vehicle is traveling, a length Lo in a vehicle width direction of an area in which the own vehicle and the preceding vehicle overlap with each other. Next, a ratio Lo/Lw of the length Lo to a total width Lw (known value) of the own vehicle 50 is calculated as the overlap rate Ro.

In step S40, the CPU executes the automatic deceleration control when the deceleration target is a deceleration target other than the preceding vehicle, for example, an intersection, a street junction, a road curve, and the like, in a manner known in the technical field.

In step S50, the CPU executes control when the preceding vehicle is stationary in accordance with the subroutine shown in FIG. 3.

In step S70, the CPU determines whether the own vehicle 50 is approaching the preceding vehicle. When the CPU makes the negative determination, the CPU temporarily ends the present control, and when the CPU makes the affirmative determination, the CPU advances the present control to step S80. When an inter-vehicle distance Dr between the preceding vehicle and the own vehicle is decreasing, or when a relative speed Vr of the own vehicle with respect to the preceding vehicle is estimated and the relative speed Vr is a positive value, the own vehicle 50 may be determined to be approaching the preceding vehicle.

In step S80, the CPU determines whether the control mode switch 34 is switched to the eco mode, that is, whether the control mode is the eco mode. When the CPU makes the affirmative determination, the CPU advances the present control to step S120, and when the CPU makes the negative determination, the CPU advances the present control to step S110.

Figure 5:
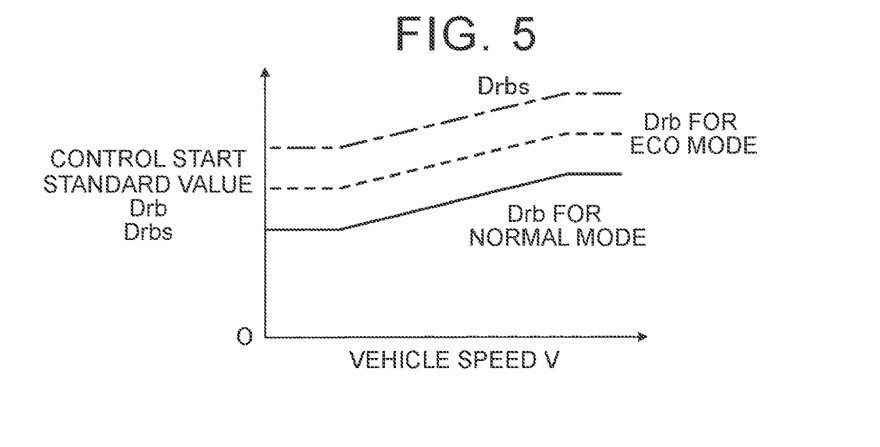
FIG. 5 is a map for calculating a control start distance standard value Drb based on a vehicle speed V.

In step S110, the CPU calculates a control start distance standard value Drb for a normal mode by referring to a map shown by a solid line in FIG. 5 based on the vehicle speed V of the own vehicle 50. As shown in FIG. 5, the control start distance standard value Drb for the normal mode is calculated so that the control start distance standard value Drb increases as the vehicle speed V increases.

In step S120, the CPU calculates the control start distance standard value Drb for the normal mode by referring to a map shown by a broken line in FIG. 5 based on the vehicle speed V of the own vehicle 50. As shown in FIG. 5, the control start distance standard value Drb for the eco mode is larger than the control start distance standard value Drb for the normal mode, and is calculated so that the control start distance standard value Drb for the eco mode increases as the vehicle speed V increases.

In step S130, the CPU performs the automatic deceleration control in accordance with the subroutine shown in FIG. 4.

Subroutine for Control when Preceding Vehicle is Stationary

In step S51 of the flowchart shown in FIG. 3, the CPU determines whether the preceding vehicle is stationary. In this case, it may be determined that the preceding vehicle is stationary when the relative speed Vr of the own vehicle with respect to the preceding vehicle is the same as the vehicle speed V of the own vehicle. When the CPU makes the affirmative determination, the CPU advances the present control to step S55, and when the CPU makes the negative determination, the CPU advances the present control to step S52.

In step S52, the CPU determines whether a flag F is 1, that is, determines whether the control when the preceding vehicle is stationary is being executed. When the CPU makes the negative determination, the CPU advances the present control to step S70, and when the CPU makes the affirmative determination, the CPU advances the present control to step S53.

Figure 9:
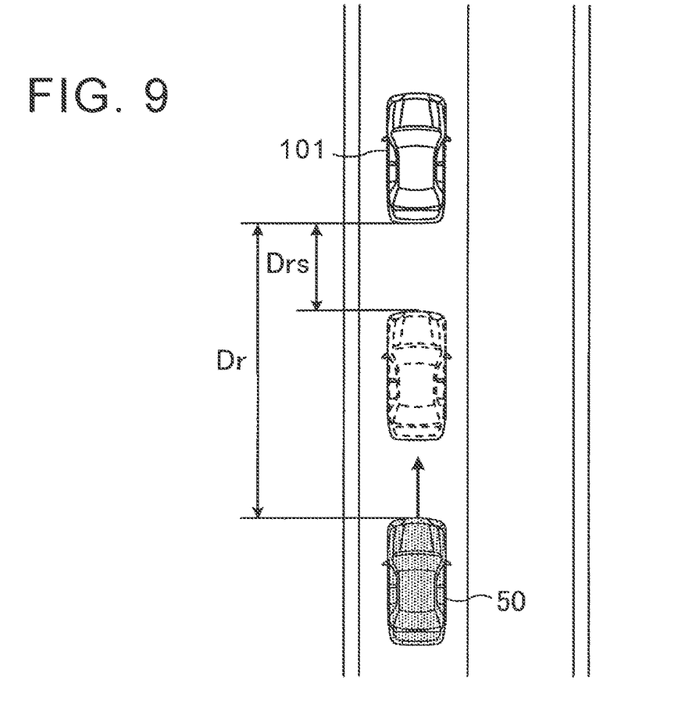
FIG. 9 is a diagram showing an inter-vehicle distance and a minimum inter-vehicle distance between the own vehicle and the preceding vehicle.

In step S53, the CPU sets an allowable minimum value Drs of the inter-vehicle distance Dr between the preceding vehicle and the own vehicle when the preceding vehicle is stationary as the sum Drsf+ΔDrs of the previous value Drsf and the increase amount ΔDrs. As shown in FIG. 9, the allowable minimum value Drs is the minimum value of the inter-vehicle distance Dr that is allowed for the own vehicle to stop in close proximity to the preceding vehicle in a stationary state, and ΔDrs is an incremental amount (positive constant) for each cycle. An initial value of the allowable minimum value Drs may be a preset positive constant.

In step S54, the CPU determines whether the relative speed Vr of the own vehicle with respect to the preceding vehicle is a positive value, that is, determines whether the own vehicle is approaching the preceding vehicle. When the CPU makes the negative determination, the CPU advances the present control to step S61, and when the CPU makes the affirmative determination, the CPU advances the present control to step S57.

In step S55, the CPU calculates a control start distance standard value Drbs when the preceding vehicle is stationary by referring to the map shown by a long dashed short dashed line in FIG. 5 based on the vehicle speed V of the own vehicle 50. As shown in FIG. 5, the control start distance standard value Drbs is calculated to a value larger than the control start distance standard value Drb for the eco mode.

Further, the CPU determines whether the inter-vehicle distance Dr between the preceding vehicle and the own vehicle is equal to or less than the control start distance standard value Drbs, that is, whether deceleration of the own vehicle should be started. When the CPU makes a negative determination, the CPU advances the present control to step S70, and when the CPU makes an affirmative determination, the flag F is set to 1 in step S56.

In step S57, the CPU determines whether the inter-vehicle distance Dr between the preceding vehicle and the own vehicle is greater than the allowable minimum value Drs. When the CPU makes the affirmative determination, the CPU advances the present control to step S59, and when the CPU makes the negative determination, the CPU advances the present control to step S58.

In step S58, the CPU stops the own vehicle or maintains the own vehicle in a stopped state by outputting a command signal to the deceleration ECU 24.

In step S59, the CPU calculates a target deceleration Gxbst for making the own vehicle decelerate so that the own vehicle stops when the inter-vehicle distance Dr becomes the allowable minimum value Drs, based on the inter-vehicle distance Dr between the preceding vehicle and the own vehicle and the vehicle speed V of the own vehicle.

In step S60, the CPU decelerates the own vehicle so that the deceleration of the own vehicle is the target deceleration Gxbst by outputting a command signal to the deceleration ECU 24. In this case, the deceleration of the own vehicle may be feedback controlled based on the front and rear acceleration Gx of the own vehicle 50 detected by the front-rear acceleration sensor 38.

In step S61, the CPU determines whether the relative speed Vr of the own vehicle with respect to the preceding vehicle is less than the standard value Vrc (0 or a negative constant), that is, whether the preceding vehicle is moving away from the vehicle. When the CPU makes a negative determination, the CPU advances the present control to step S63, and when the CPU makes an affirmative determination, the flag F is reset to 0 in step S62.

In step S63, similar to step S57, the CPU determines whether the inter-vehicle distance Dr between the preceding vehicle and the own vehicle is greater than the allowable minimum value Drs. When the CPU makes the negative determination, the CPU advances the present control to step S59, and when the CPU makes the affirmative determination, the CPU advances the present control to step S64.

In step S64, the CPU releases the automatic deceleration of the own vehicle by outputting a command signal to the deceleration ECU 24. In this case, acceleration of the own vehicle may be allowed by releasing the automatic deceleration of the own vehicle and outputting a command signal to the acceleration ECU 44.

In a case in which the CPU executes the control when the preceding vehicle of step S50 is stationary, that is, executes the control of steps S521 to S64, by operating an alarm device not shown in FIG. 1, the alarm may be issued, and the controls may be displayed on a display not shown in FIG. 1.

Automatic Deceleration Control Subroutine

In step S131 of the flowchart shown in FIG. 4, the CPU calculates a collision prediction time TTC that is a predicted time until the own vehicle 50 collides with the preceding vehicle. The collision prediction time TTC is calculated according to the following equation (1) based on the inter-vehicle distance Dr between the own vehicle and the preceding vehicle and the relative speed Vr of the own vehicle with respect to the preceding vehicle. The collision prediction time TTC is an index value that expresses the high probability of the own vehicle colliding with the preceding vehicle, and the smaller the value, the higher the possibility (risk) of the own vehicle colliding with the preceding vehicle.

$$TTC=Dr/Vr \quad (1)$$

In step S132, the CPU determines whether the automatic deceleration control is being performed. When the CPU makes the negative determination, the CPU advances the present control to step S135, and when the CPU makes the affirmative determination, the CPU advances the present control to step S133.

In step S133, the CPU determines whether the collision prediction time TTC is equal to or greater than a control end standard value TTCe (positive constant), that is, determines whether a termination condition of the automatic deceleration control is satisfied. When a negative determination is made, the CPU proceeds this control to step S137, and when an affirmative determination is made, the automatic deceleration control is terminated by outputting a control end command signal to the deceleration ECU 24 in step S134.

In step S135, the CPU determines whether the collision prediction time TTC is equal to or less than a control permission standard value TTCa (a positive constant smaller than the control end standard value TTCe), that is, whether a first start condition of the automatic deceleration control is satisfied. When the CPU makes the negative determination, the CPU temporarily ends the present control, and when the CPU makes the affirmative determination, the CPU advances the present control to step S136.

In step S136, the CPU determines whether the inter-vehicle distance Dr between the own vehicle and the preceding vehicle is equal to or less than the control start distance standard value Drb, that is, whether a second start condition of the automatic deceleration control is satisfied. When the CPU makes the negative determination, the CPU temporarily ends the present control, and when the CPU makes the affirmative determination, the CPU advances the present control to step S137.

In step S137, the CPU calculates the target deceleration Gxbt for automatically decelerating the own vehicle based on the inter-vehicle distance Dr between the preceding vehicle and the own vehicle, the collision prediction time TTC, and the vehicle speed V of the own vehicle.

In this case, the target deceleration Gxbt may be calculated as follows, for example. First, the target inter-vehicle distance Drt for avoiding the own vehicle excessively approaching the preceding vehicle is calculated so that the higher the actual vehicle speed V detected by the vehicle speed sensor 36, the longer the target inter-vehicle distance Drt, and the target inter-vehicle time Tt is calculated so that the higher the vehicle speed V, the longer the target inter-vehicle time Tt. The target vehicle speed Vt is calculated by dividing the target inter-vehicle distance Drt by the target inter-vehicle time Tt, and an increase amount ΔGxbt of each cycle of the target deceleration Gxbt for making the actual vehicle speed V become the target vehicle speed Vt at a predetermined time is calculated so that the target deceleration Gxbt is gradually increased. An upper limit value Gxbtmax of the target deceleration Gxbt is calculated so that the higher the vehicle speed V of the own vehicle, the greater the upper limit value Gxbtmax, and when the calculated target deceleration is equal to or greater than the upper limit value Gxbtmax, the target deceleration Gxbt is set to the upper limit value Gxbtmax.

In step S137, the CPU executes the automatic deceleration control, by decelerating the own vehicle so that the deceleration of the own vehicle is the target deceleration Gxbt, by outputting a command signal to the deceleration ECU 24.

Thus, in a situation where the permission condition of the automatic deceleration control is established (S10 to S30, S70), when the collision prediction time TTC is determined to be equal to or less than the control permission standard value TTCa and the inter-vehicle distance Dr between the own vehicle and the preceding vehicle is determined to be equal to or less than the control start distance standard value Drb, it is determined that the starting conditions of the automatic deceleration control are established. When it is determined that the start condition of automatic deceleration control is satisfied, the automatic deceleration control is executed until it is determined that the collision prediction time TTC is equal to or greater than the control end standard value TTCe and that the end condition of automatic deceleration control is satisfied. The automatic deceleration control is performed by calculating the target deceleration Gxbt for avoiding the own vehicle excessively approaching the preceding vehicle, and by automatically decelerating the vehicle by braking so that the deceleration of the own vehicle is the target deceleration Gxbt.

As described above, when the control mode is in the normal mode, the control start distance standard value Drb is calculated to be the control start distance standard value Drb for the normal mode (S110), and when the control mode is in the eco mode, the control start distance standard value Drb is calculated to be the control start distance standard value Drb for the eco mode (S120). The control start distance standard value Drb for the eco mode is larger than the control start distance standard value Drb for the normal mode (see FIG. 5). Therefore, when the control mode is in the eco mode, the automatic deceleration control is started at a stage where the inter-vehicle distance Dr is larger than when the control mode is in the normal mode, that is, at an earlier stage.

Further, when it is determined that the collision prediction time TTC is equal to or more than the control end standard value TTCe and the end condition of automatic deceleration control is satisfied, the automatic deceleration control ends.

Therefore, when the control mode is in the eco mode, compared to when the control mode is in the normal mode, the automatic deceleration control ends at a stage where the inter-vehicle distance Dr is large, and the time during which the automatic deceleration control is executed is shortened. Therefore, according to the embodiment, when the control mode is in the eco mode, the energy consumed by the automatic deceleration control can be reduced compared to when the control mode is in the normal mode.

Figure 12:
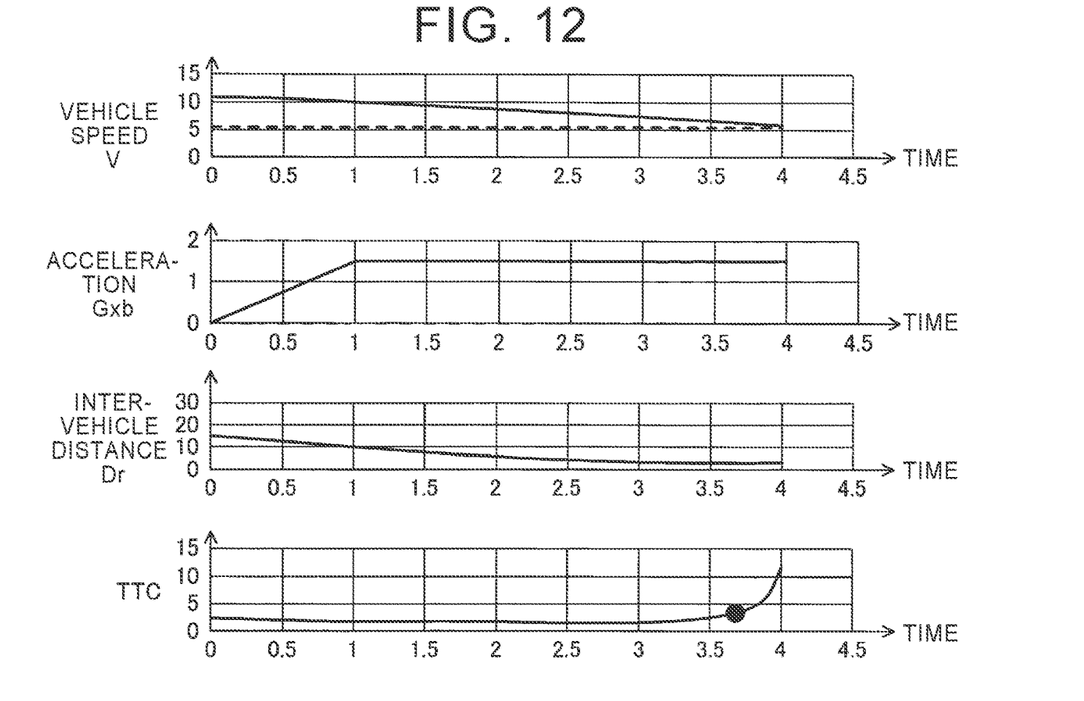
FIG. 12 is a time chart showing changes in inter-vehicle distance Dr and TTC when the control start distance standard value Drb is small.
Figure 13:
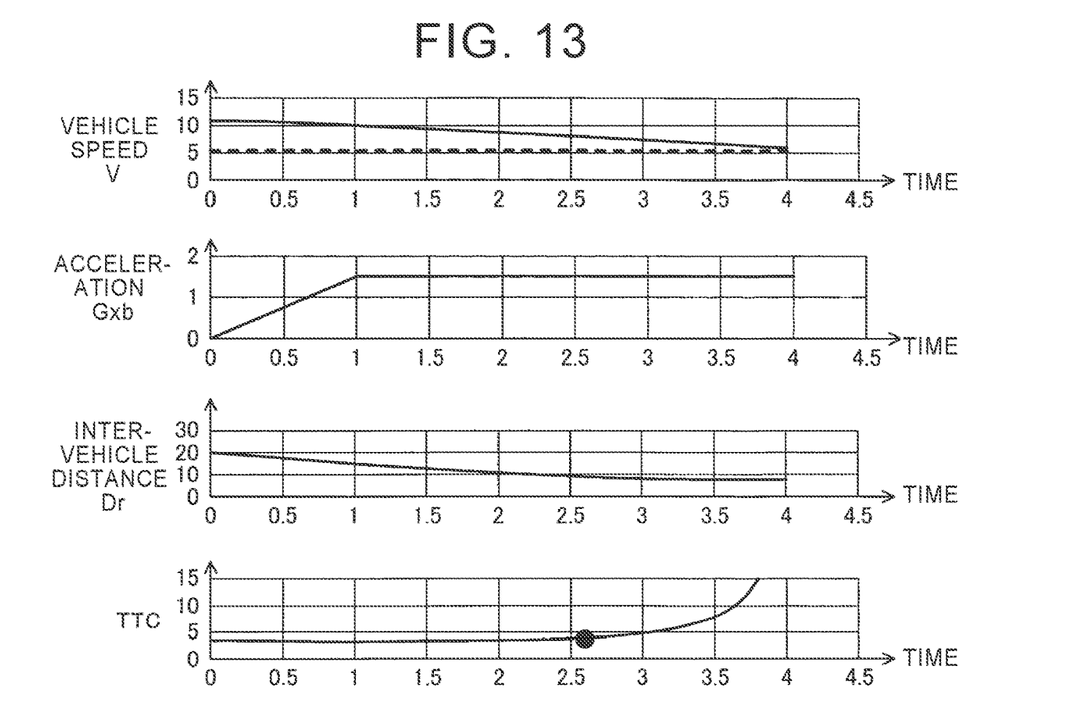
FIG. 13 is a time chart showing changes in the inter-vehicle distance Dr and TTC when the control start distance standard value Drb is large.

For example, in FIGS. 12 and 13, shows a change of the inter-vehicle distance Dr and the TTC, when the vehicle speed V of the own vehicle is 11 m/sec and the vehicle speed of the preceding vehicle is 5.5 m/sec, the deceleration Gxb is linearly increased to 1.5 m/sec$^2$ by taking 0 to 1 sec, and then the deceleration Gxb is maintained at 1.5 m/sec$^2$. In particular, FIG. 12 shows changes in the inter-vehicle distance Dr and TTC, when the control start distance standard value Drb is 15 m, and FIG. 13 shows changes in the inter-vehicle distance Dr and TTC when the control start distance standard value Drb is 20 m.

As indicated by black circles in FIGS. 12 and 13, the control end standard value TTCe is 4 sec. In the case of FIG. 12, the automatic deceleration control ends when 3.7 sec has elapsed since the automatic deceleration control is started. On the other hand, in the case of FIG. 13, the automatic deceleration control ends when 2.6 sec has elapsed since the automatic deceleration control is started. Therefore, in the case of FIG. 13 where the control start distance standard value Drb is large, it can be seen that the duration of the automatic deceleration control is shorter than in the case of FIG. 12.

Further, according to the embodiment, as shown in FIG. 5, the control start distance standard value Drb is set to be variable in accordance with the vehicle speed so that the higher the vehicle speed V of the own vehicle 50, the larger the control start distance standard value Drb (S110, S120).

Therefore, since the control start distance standard value can be increased as the vehicle speed of the own vehicle 50 increases, the control start distance standard value Drb can be set to an appropriate value according to the vehicle speed. That is, compared to the case where the control start distance standard value Drb is a constant value regardless of the vehicle speed, the possibility that the automatic deceleration control is started unnecessarily early due to the control start distance standard value being too large in a situation where the vehicle speed of the own vehicle is low can be decreased. In contrast, the possibility that the start of automatic deceleration control is delayed due to the fact that the control start distance standard value is too small in a situation where the own vehicle speed of the vehicle is high can be reduced.

Further, according to the embodiment, when it is determined that the preceding vehicle is stationary (S51), the own vehicle is decelerated so that the own vehicle does not approach the preceding vehicle for more than the minimum distance Drbs (S59, S60), and when it is determined that the preceding vehicle has resumed traveling (S51, S52), the deceleration of the own vehicle continues until it is determined that the preset release condition is established (S54).

Therefore, it is possible to suppress the own vehicle from excessively approaching the stationary preceding vehicle, and even if the preceding vehicle resumes traveling, the deceleration of the own vehicle is continued until it is determined that the preset release condition is satisfied and it is possible to suppress the own vehicle from excessively approaching the preceding vehicle.

Further, according to the embodiment, when it is determined that the preceding vehicle has resumed traveling (S51, S52), the minimum distance Drbs is gradually increased (S53), and when it is determined that the relative speed Vr is 0 or less than the negative relative speed standard value Vrc and it is determined that the inter-vehicle distance Dr exceeds the minimum distance Drbs (S63), it is determined that the preset release condition is established (S64).

Therefore, compared to the case where the minimum distance is not gradually increased even if the preceding vehicle resumes traveling, the possibility that it is determined that the inter-vehicle distance excessively quickly exceeds the minimum distance can be reduced, and the possibility that the own vehicle excessively approaches the preceding vehicle excessively can be reduced.

Modification

Figure 10:
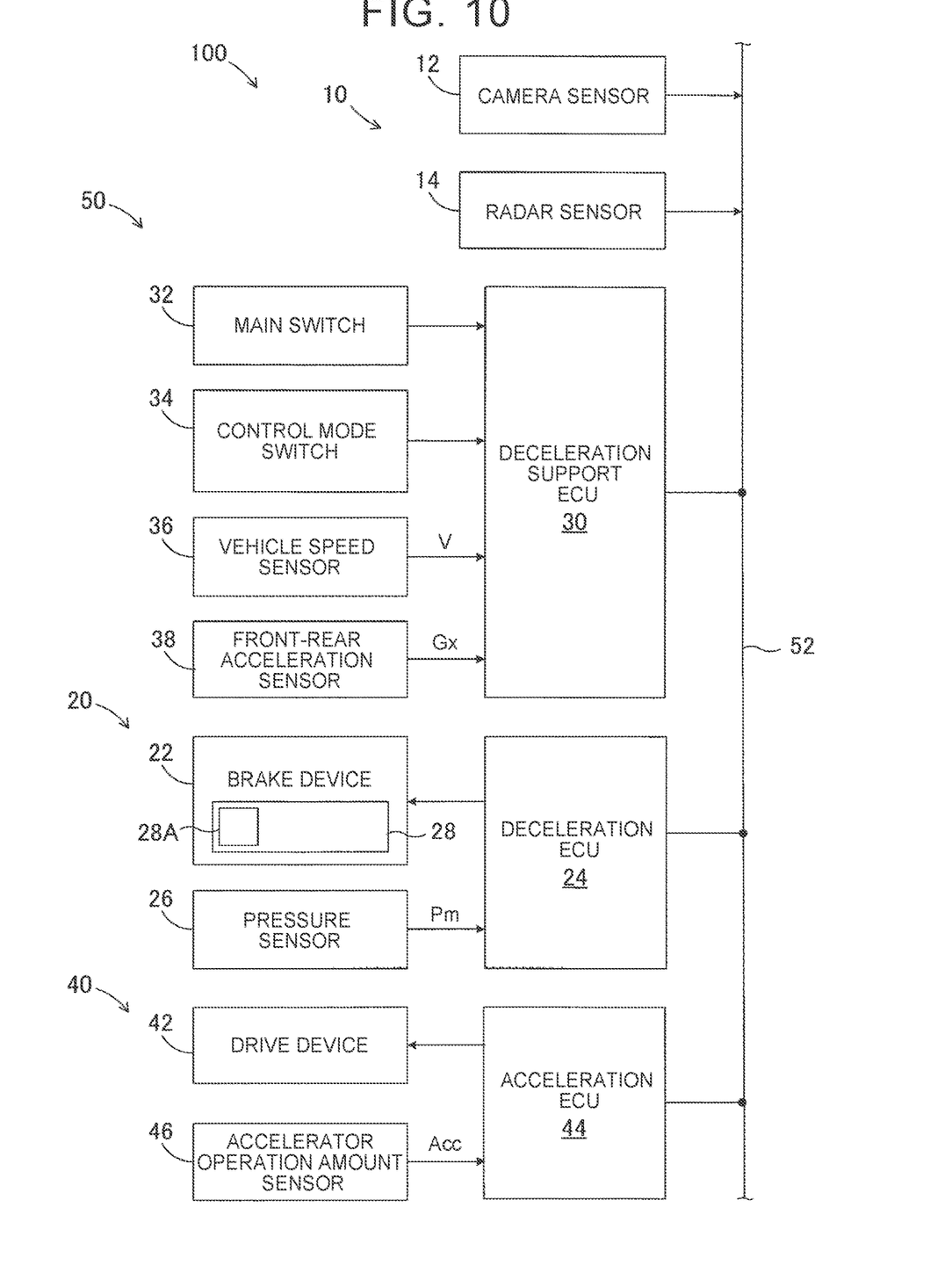
FIG. 10 is a schematic configuration diagram showing a modified example of the deceleration support device according to the present disclosure.

In the modification, as shown in FIG. 10, the brake device 22 includes a regenerative brake device 28 controlled by the deceleration ECU 24, and performs regenerative braking by the regenerative brake device 28 during braking. The electricity generated by the regenerative braking is recovered by charging a battery 28A of the regenerative brake device 28. When a charge margin rate Rc (%) ratio, which is a ratio of a current charge margin to a charge capacity of the battery 28A, becomes equal to or greater than a standard value Rcf (positive constant), it is determined that there is a margin for regeneration by the regenerative brake device 28.

Figure 11:
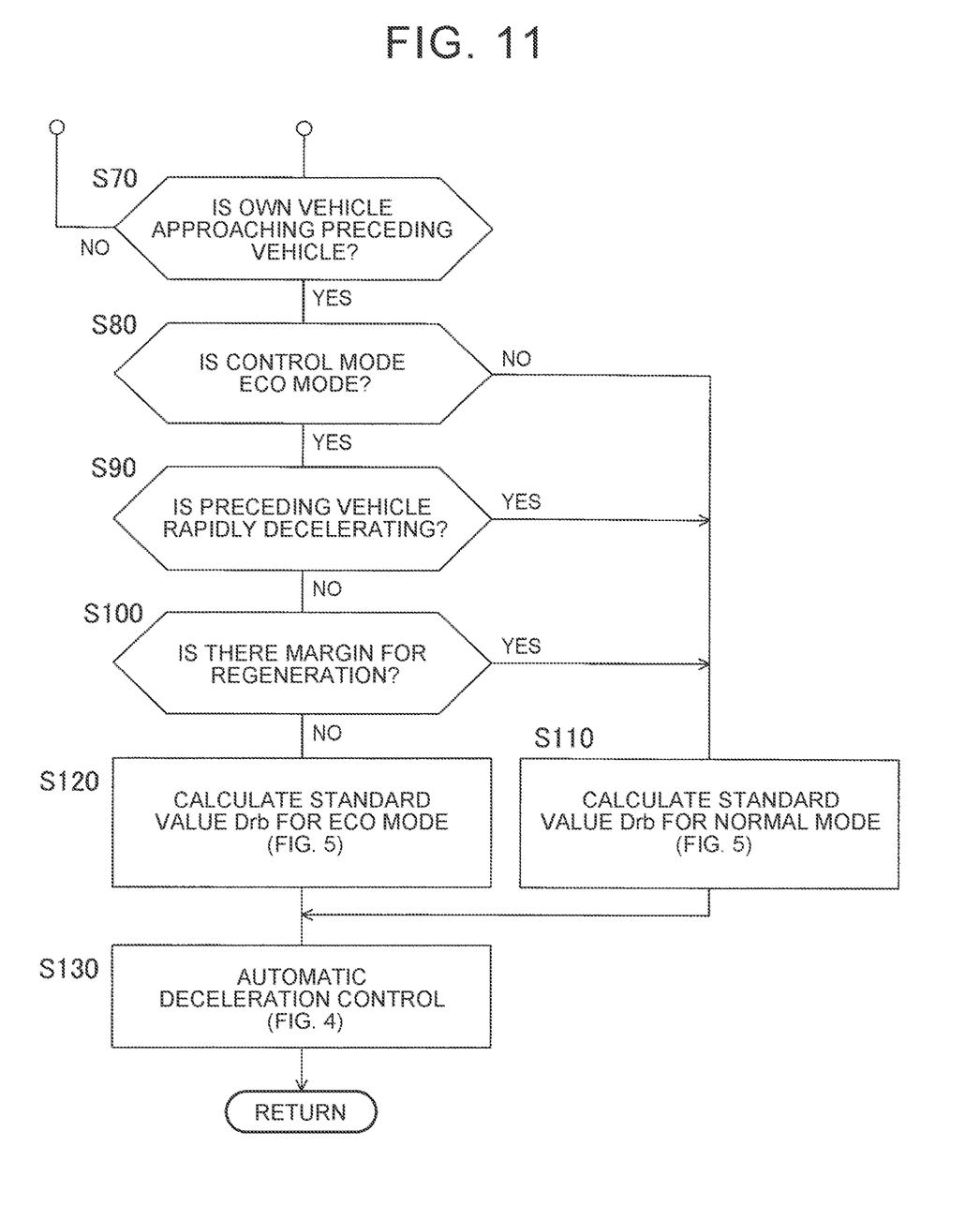
FIG. 11 is a flowchart showing a main part of a main routine of deceleration support control in the modification.

Next, with reference to the flowchart shown in FIG. 11, the deceleration support control routine in the modification will be described. The deceleration support control by the flowchart shown in FIG. 11 is also repeatedly executed by the CPU of the deceleration support ECU 30 at a predetermined control cycle when the main switch 32 is turned on.

The CPU executes steps S10 to S80 and steps S110 to S130 in the same manner as the corresponding steps in the embodiment, and when there is an affirmative determination in step S80, the present control proceeds to step S90.

In step S90, the CPU calculates a relative deceleration Gxr of the preceding vehicle with respect to the own vehicle based on the time derivative value of the relative speed Vr of the own vehicle with respect to the preceding vehicle and the deceleration of the own vehicle. Furthermore, the CPU determines whether the preceding vehicle is decelerating rapidly by determining whether the relative deceleration Gxr is equal to or greater than the standard value Gxrc (positive constant). When the CPU makes the affirmative determination, the CPU advances the present control to step S110, and when the CPU makes the negative determination, the CPU advances the present control to step S100.

In step S100, the CPU determines whether the charge margin rate Rc of the battery 28A is equal to or greater than the standard value Rcf (positive constant) so as to determine whether there is a margin of regeneration by the regenerative brake device 28. When the CPU makes the affirmative determination, the CPU advances the present control to step S110, and when the CPU makes the negative determination, the CPU advances the present control to step S120.

Thus, in a situation where the permission condition for the automatic deceleration control is met (S10 to S30, S70), when the relative deceleration Gxr of the preceding vehicle with respect to the own vehicle is equal to or higher than the standard value Gxrc (S90), even when the control mode is in the eco mode (S80), the control start distance standard value Drb for the normal mode is calculated. Therefore, when the preceding vehicle is decelerating rapidly, the automatic deceleration control is executed at the control start distance standard value Drb for the normal mode, and the own vehicle can be effectively decelerated so that the own vehicle does not excessively approach the preceding vehicle.

Further, in a situation where the permission condition for the automatic deceleration control is established (S10 to S30, S70), when the charge margin rate Rc of the battery 28A is equal to or higher than the standard value Rcf (S100), even when the control mode is in the eco mode (S80), the control start distance standard value Drb for the normal mode is calculated. Therefore, when there is a margin for regeneration by the regenerative brake device 28, the battery 28A can be effectively charged by executing the automatic deceleration control with the control start distance standard value Drb for the normal mode, effectively decelerating the own vehicle, and regenerating performed by the regenerative brake device 28.

Steps S90 and S100 are performed in addition to the steps of the embodiment. Thus, according to this modification, all the operation and effects obtained by the above-described embodiment can be obtained.

The present disclosure has been described in detail above with respect to specific embodiments and modifications. However, it is obvious to those skilled in the art that the present disclosure is not limited to the above-described embodiments and modifications, and various other embodiments are possible within the scope of the present disclosure.

For example, in the above-described embodiments and modifications, when it is determined in step S30 that the deceleration target is not a preceding vehicle, in step S40, the automatic deceleration control in a case in which the deceleration target is a deceleration target other than the preceding vehicle, for example, an intersection, a street junction, a road curve, etc. is executed. However, when step S40 is omitted and it is determined that the deceleration target is not a preceding vehicle, the deceleration support control shown in FIG. 2 may be modified so as to temporarily end.

Further, in the above-described embodiments and modifications, the control when the preceding vehicle is stationary is executed in step S50. However, step S50 may be omitted.

Further, in the above-described embodiments and modifications, in step S50, when the inter-vehicle distance Dr between the preceding vehicle and the own vehicle is larger than the allowable minimum value Drs, the own vehicle is decelerated, and when the inter-vehicle distance Dr between the preceding vehicle and the own vehicle is equal to or less than the allowable minimum value Drs, the own vehicle is stopped. However, when the vehicle speed V of the own vehicle is equal to or less than the end reference vehicle speed due to the own vehicle being decelerated, the deceleration support control may be terminated and modified to shift to a collision suppression control.

Further, in the above-described embodiments and modifications, the increase amount ΔGxbt when calculating the target deceleration Gxbt in step S137 is the same as the case in which the control mode is in the normal mode, even when the control mode is in the eco mode. However, the increase amount ΔGxbt when calculating the target deceleration Gxbt may be smaller than the case in which the control mode is in the normal mode, when the control mode is in the eco mode.

Further, in the above-described embodiments and modifications, the control start distance standard value Drbs in the determination of step S55 is the same as the case in which the control mode is a normal mode, even when the control mode is the eco mode. However, when the control mode is in the eco mode, the control start distance standard value Drbs may be larger than when the control mode is in the normal mode.

Further, in the above-described modification, step S90 is executed when an affirmative determination is made in step S80, and step S100 is executed when a negative determination is made in step S90. However, one of steps S90 and S100 may be omitted.

What is claimed is:

1. A deceleration support device comprising:
a target detection device, including a camera sensor and a radar sensor, that detects at least a target in front of an own vehicle;
a pressure sensor and an acceleration operation amount sensor that detect a braking-driving operation by a driver;
a brake that decelerates the own vehicle;
a memory that stores a program; and
a processor configured to execute the program to:
determine whether the braking-driving operation is detected;
based upon a determination that the braking-driving operation is not detected, determine whether a preceding vehicle that requires deceleration of the own vehicle is detected by the target detection device and the own vehicle is approaching the preceding vehicle;
calculate an index value acquired by dividing an inter-vehicle distance between the preceding vehicle and the own vehicle by a relative speed of the own vehicle with respect to the preceding vehicle,
wherein a preset start condition is established when the inter-vehicle distance becomes equal to or less than a control start distance standard value and the collision prediction time TTC is determined to be equal or less than a control permission standard value TTCa, and the index value is equal to or less than a start standard value,
wherein a preset end condition is established when the index value becomes equal to or greater than an end standard value and the collision prediction time TTC is equal to or greater than a control end standard value TTCe,
wherein the own vehicle includes a switch that is operated by the driver and that switches and sets a traveling mode of the own vehicle to a normal mode and an eco mode that reduces energy required for traveling of the own vehicle;
set the control start distance standard value to a value for the eco mode that is larger than a standard value for the normal mode when the traveling mode is set to the eco mode; and
when the preset start condition is established, execute an automatic deceleration control that automatically decelerates the own vehicle by controlling the deceleration device until the preset end condition is established.

2. The deceleration support device according to claim 1, wherein the processor is further configured to variably set the control start distance standard value in accordance with a vehicle speed of the own vehicle such that the higher the vehicle speed of the own vehicle, the larger the control start distance standard value.

3. The deceleration support device according to claim 1, wherein the processor is further configured to set the control start distance standard value to the standard value for the normal mode, when a relative deceleration of the preceding vehicle with respect to the own vehicle is equal to or greater than a preset relative deceleration standard value, and the traveling mode is set to the eco mode.

4. The deceleration support device according to claim 1, wherein the brake includes a regenerative brake device, and the processor is further configured to set the control start distance standard value to the standard value for the normal mode, when a charge margin rate of a battery of the regenerative brake device is equal to or greater than a preset charge margin standard value, and the traveling mode is set to the eco mode.

5. The deceleration support device according to claim 1, wherein the processor is further configured to decelerate the own vehicle such that the own vehicle does not approach the preceding vehicle by a minimum distance or more when the processor determines that the preceding vehicle is stationary, and maintain deceleration of the own vehicle until a preset release condition is established, when the processor determines that the preceding vehicle resumes traveling.

6. The deceleration support device according to claim 5, wherein the processor is further configured to increase the minimum distance when the preceding vehicle resumes traveling, and determine that the preset release condition is established when the relative speed is less than a negative relative speed standard value and that the inter-vehicle distance exceeds the minimum distance.

* * * * *